June 22, 1965 E. C. BULLWINKEL ETAL 3,190,958
FREQUENCY-SHIFT-KEYED SIGNAL GENERATOR WITH PHASE
MISMATCH PREVENTION MEANS
Filed Sept. 5, 1962 3 Sheets-Sheet 1

INVENTORS,
EDWARD C. BULLWINKEL
ELIS D. HANSON &
ROBERT E. WEBB.
BY Harry M. Saragovitz
ATTORNEY.

INVENTORS,
EDWARD C. BULLWINKEL
ELIS D. HANSON &
ROBERT E. WEBB.
BY Harry M. Saragovitz
ATTORNEY.

INVENTORS,
EDWARD C. BULLWINKEL
ELIS D. HANSON &
ROBERT E. WEBB.
BY Harry M. Saragovitz
ATTORNEY.

United States Patent Office 3,190,958

Patented June 22, 1965

3,190,958

FREQUENCY-SHIFT-KEYED SIGNAL GENERATOR WITH PHASE MISMATCH PREVENTION MEANS

Edward C. Bullwinkel, Little Silver, Elis D. Hanson, Eatontown, and Robert E. Webb, Long Branch, N.J., assignors to the United States of America as represented by the Secretary of the Army Filed Sept. 5, 1962, Ser. No. 221,635
3 Claims. (Cl. 178—66)
(Granted under Title 35, U.S. Code (1952), sec. 266)

The invention described herein may be manufactured and used by or for the Government for governmental purposes without the payment of any royalty thereon.

The present invention relates to telegraph signal generation and more particularly to novel circuitry for generating frequency shift keyed signals of the cosine type. In this type of signaling system, called FSK Cosine, a binary "1" or mark is represented by a full cycle of a cosine wave at a given frequency, $f$, and a "0" or space is represented by one-half a cycle of a cosine wave of frequency $f/2$. There are many advantages to this method of signaling. Most of the spectral energy is concentrated in a narrow band equal to one-half the bit rate, the signal has no D.C. component, and the bandwidth required for transmission is less than that of pulse type signals because of the absence of sharp discontinuities in the waveform. The technique used is to gate onto the output line one of four possible cosinusoidal waveforms for each transmission baud or time slot. For a 1 or a mark a positive or negative cosine wave of frequency $f$ is transmitted and for a 0 or space either a positive or negative cosine wave of frequency $f/2$. The intelligence in the signal is contained solely in the frequency thereof, the phase or polarity of each signaling element or baud being chosen merely to eliminate sharp discontinuities or phase mismatch in the output line and thus produce a smoothly varying output signal. The phase or polarity of each baud must be chosen so that the instantaneous amplitude of the signal at the beginning of the baud is the same as that at the end of the preceding baud. Thus the phase or polarity of each baud depends on the past history of the signal. The present invention provides relatively simple logic circuitry for automatically making this choice.

It is therefore an object of this invention to provide a novel and useful generator of FSK Cosine telegraph signals.

It is a further object of this invention to provide a generator of FSK Cosine signals which automatically corrects for phase mismatch in the output signal.

Figure 1:
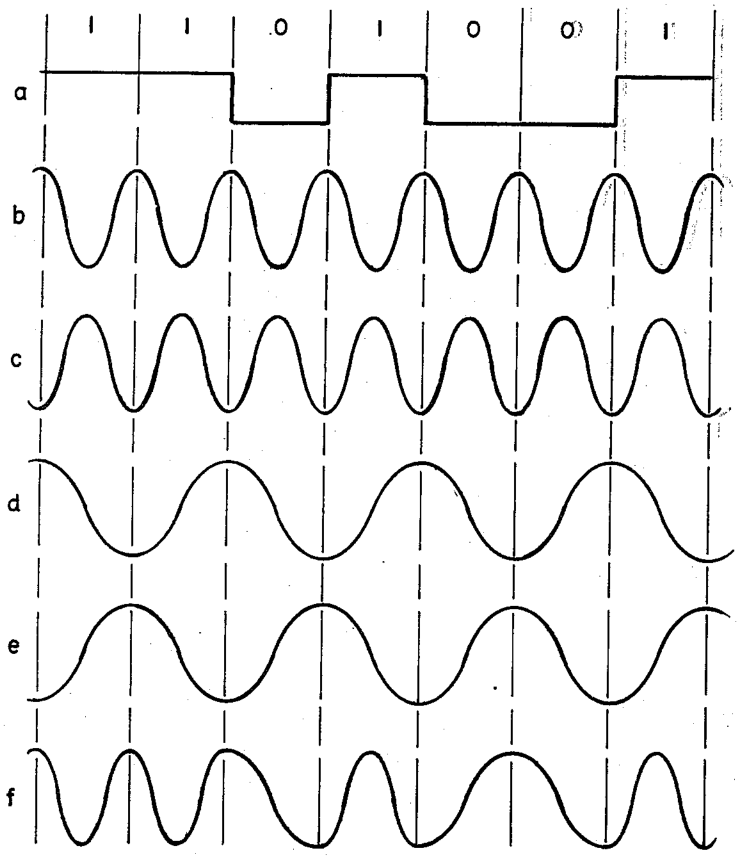
Figure 2:
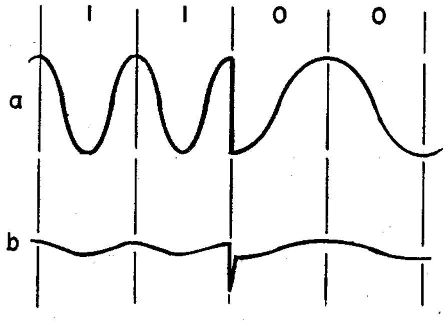
Figure 3:
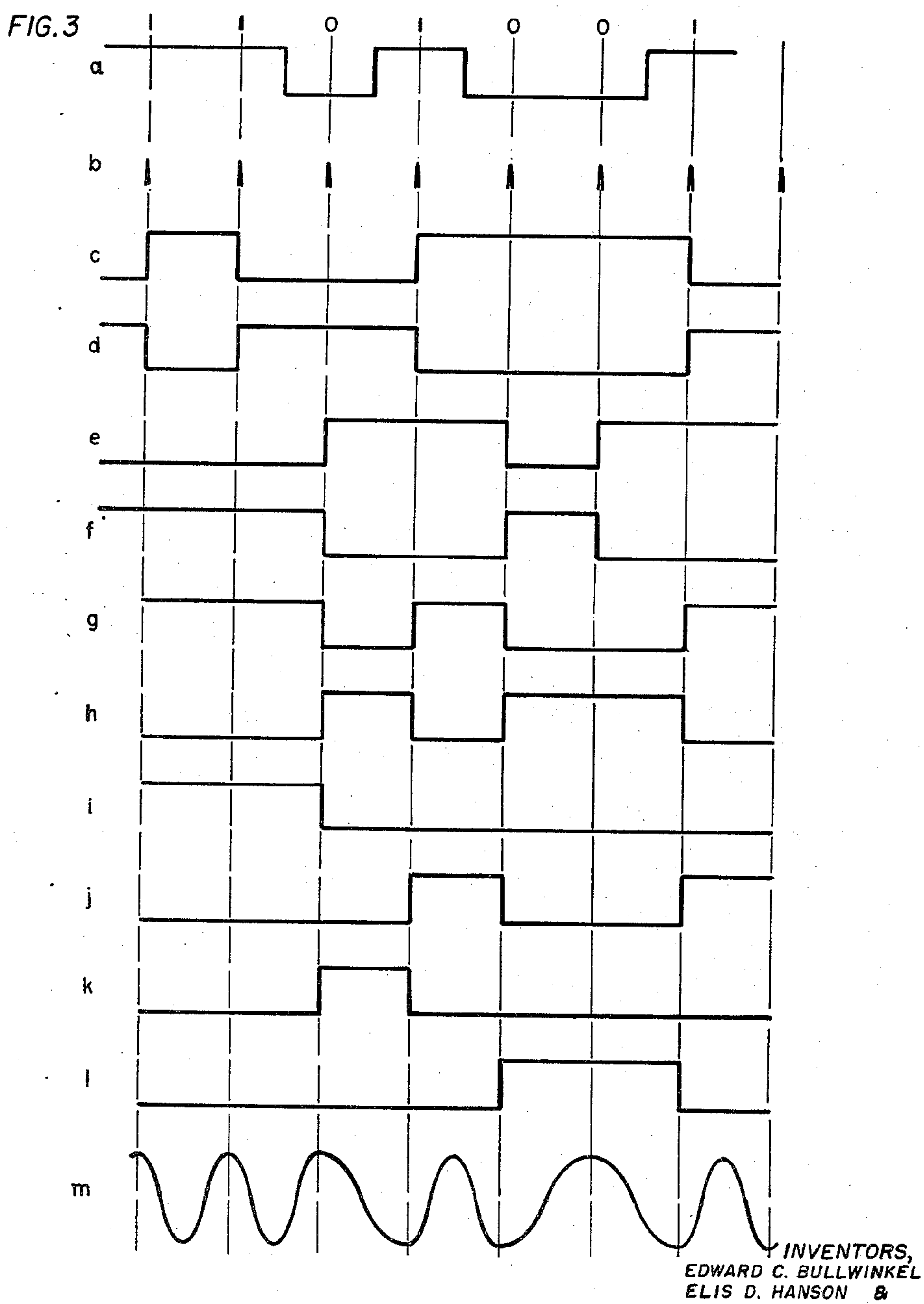
Figure 4:
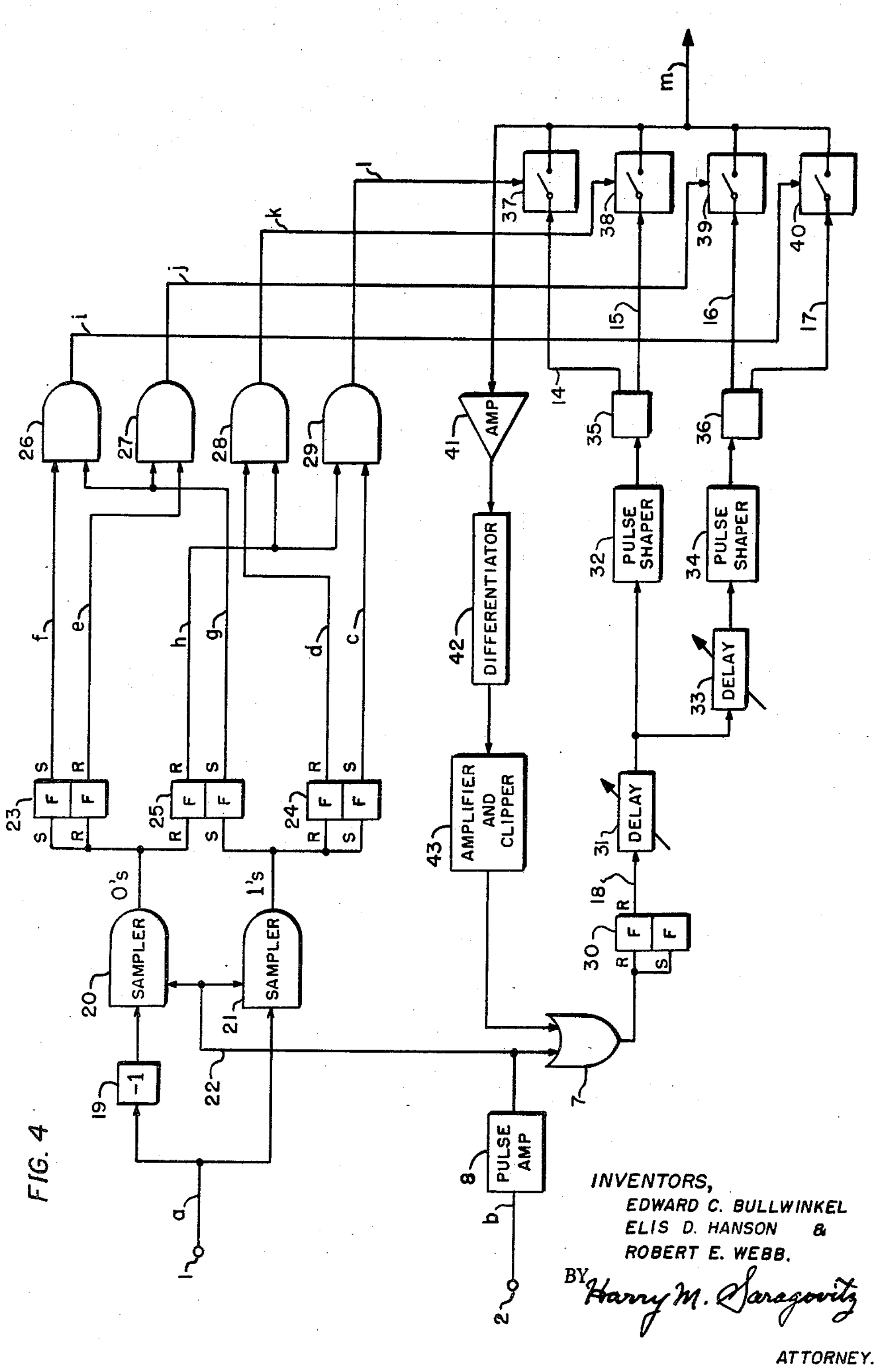

Other objects and advantages of the present invention will become apparent from the following detailed description and drawings, in which:

FIGS. 1, 2 and 3 are waveforms useful in explaining the invention and FIG. 4 is a block diagram of a preferred embodiment of the invention.

Referring first to FIG. 1, FIG. 1*a* shows a binary type signal in which 1's and 0's are represented by the presence and absence respectively of a D.C. voltage. FIG. 1*f* is the same signal (1101001) after conversion to FSK Cosine. FIGS. 1*b*–*e* are the four waveforms selected portions of which are sequentially applied to the output line to form the signal 1*f*. Waveform 1*b* is a positive cosine wave, 1*c* a negative cosine wave, 1*d* and 1*e* are positive and negative cosine waves of one-half frequency of 1*b* and 1*c*. It can be seen from FIG. 1 that the output signal 1*f*, consists of portions of each of the four cosine waves; the first two 1's comprise 1*b*, the third baud is a zero and comprises a half cycle of the positive cosine wave of half frequency, 1*d*; the fourth baud is a 1 but must be a negative cosine wave of the higher frequency (1*c*) in order to provide a phase match with the preceding baud.

Similarly, the following two 0's are represented by the negative cosine wave of half frequency, 1*e*.

The circuit of FIG. 4 generates the wave 1*f* when fed a binary stream of information, such as 1*a*. FIG. 3 shows waveforms on various lines of FIG. 4, the waveforms and their associated lines being indicated by the same reference letter in both figures. The binary stream of information, such as 3*a*, is fed to terminal 1 and is split into two paths and fed to two sampler circuits 20 and 21. One of these paths contains an inverter 19 which inverts the phase of the signal, that is, it converts 1's to 0's and vice versa. The sampler circuits are also fed by a stream of clock pulses, 3*b*, from terminal 2, pulse amplifier 8 and line 22. Both the sampler circuits are essentially AND gates. Sampler 20 therefore produces a pulse output for each 0 in the waveform *a* and sampler 21 a pulse for each 1 therein, both outputs being synchronized with the clock. The output of sampler 20 is fed to both the set and reset inputs of complementing flip-flop 23 and the output of sampler 21 is similarly fed to both inputs of complementing flip-flop 24. Also, the output of sampler 21 is fed to the set input of flip-flop 25 and the output of sampler 20 is fed to the reset input of the same flip-flop. With this arrangement, flip-flop 23 reverses its state for each 0 in the binary stream 3*a*, and flip-flop 24 reverses its state for each 1 therein. It can be seen from FIG. 3*g* that the set output of flip-flop 25 on line *g* is the original binary signal, *a*, synchronized with the clock pulses; the reset output thereof, *h*, being the complement or inversion thereof. The set output of flip-flop 25 is fed to AND gates 26 and 27 as one input of each, the other inputs of which comprise one of the two outputs, *f* and *e*, of flip-flop 23. The reset output of flip-flop 25, *h*, is similarly fed to AND gates 28 and 29, the other two inputs of which comprise one of the two outputs, *d* and *c*, of flip-flop 24. Thus, the un-inverted binary signal, *g*, is separately ANDed with both outputs, *e* and *f*, of the 0 triggered flip-flop 23 and the inverted binary signal, *h*, is ANDed with the outputs of 1 triggered flip-flop 24. Only one of the four AND gates 26–29 will produce an output in any given baud. The four outputs of the AND gates 26–29 control electronic switches 37–40 which apply the proper signal from signal generators 35 or 36 to output line *m*. Signal generators 35 and 36 may comprise resonant ringing circuits which are shock-excited by every other, or every second, clock pulse. Ringing circuit 35 is tuned to frequency $f/2$ and 36 to frequency $f$. Clock pulses *b* are applied to frequency dividing flip-flop 30 through OR gate 7. The output of 30, which is a train of pulses at frequency $f/2$, is applied to variable delay circuit 31. The divided clock pulses are applied to ringing circuit 35 after passing through pulse shaper 32 and to ringing circuit 36 after passing through variable delay circuit 33 and pulse shaper 34. The divided clock pulses shock-excite ringing circuit 35 once during each resonant cycle thereof and ringing circuit 36 once during every other cycle thereof. Thus the signal generators 35 and 36 produce the cosinusoidal signals *b*–*e* of FIG. 1, phase-locked with the clock. Each signal generator is provided with two outputs, one of which provides a positive cosine wave and the other a negative cosine wave. This may be easily accomplished by providing push-pull outputs for each of the resonant ringing circuits, for example, a center-tapped transformer may be used to extract the energy from the resonant ringing circuits. Line 14 is fed to electronic switch 37, which is normally open but is closed when an output is produced by AND gate 29 on line *l*. The other three outputs 15, 16 and 17 of the ringing circuits are similarly controlled by the outputs of AND gates 28, 27 and 26, respectively. The negative cosine wave of frequency $f/2$, FIG. 1*e*, appears on line 14; the positive cosine wave of frequency $f/2$, FIG. 1*d*, on line 15; the negative cosine wave of frequency $f$ appears on line 16; and the positive cosine wave of frequency $f$ appears on line 17. The outputs of all the electronic switches 37–40 are tied together to form the output line *m*.

The logical operations performed by the circuitry can be understood by reference to the waveforms of FIG. 3. The arbitrary assumption will be made that when power is applied to the circuit the two complementing flip-flops 23 and 24 initially assume opposite states, that is, one is set and the other reset. In FIG. 3 it is assumed that 23 is initially set, that is, the voltage on line *e* is zero and high on line *f*, and 24 is initially reset, that is, line *c* is zero and line *d* high. The first 1 in the binary waveform, *a*, will then set flip-flop 24 and raise the voltage on line *c*, the second 1 will reset flip-flop 24 and reduce the voltage on line *c* to zero. During the first two bauds, the flip-flap 23 will remain set since sampler 20 produces an output only in response to 0's in the input waveform. The first 0 in the binary waveform, *a*, will produce an output from sampler 20 and reset flip-flop 23 thereby raising the voltage on line *e* during the third baud. During the fourth baud the sampler 21 will produce an output due to the 1 signal at its input and flip-flop 24 will be set, raising the voltage on line *c*. During the fourth baud the flip-flop 23 will remain reset since sampler 20 produces an output only in response to 0's in the input waveform *a*. The remainder of the waveforms *c* and *e* are produced in similar fashion. The reset outputs of these flip-flops, *d* and *f*, are the complements of the corresponding set outputs. The waveform *g* is the set output of flip-flop 25 and is the same as waveform *a* but locked in phase with the clock. Line *g* therefore will be high only when a mark or 1 appears in the binary output signal and is therefore used as one input to each of the two AND gates 26 and 27 which control the application of the mark or 1 signals to the output line. Similarly, the reset output *h* of flip-flop 25 will be high only during 0's or spaces and is therefore used as one input to each of the two AND gates 28 and 29 which control the application of space or 0 signals to the output line. Referring again to FIG. 3, during the first two bauds both inputs, *g* and *f*, of AND gate 26 are high and this gate will therefore produce an output, *i*. This signal closes electronic switch 40 and applies a positive cosine wave of frequency $f$ to the output line *m*. During the third baud the two inputs *h* and *d* of gate 28 are high and the output *k* thereof will close electronic switch 38, thereby applying a positive cosine wave of frequency $f/2$ to its output. During the fourth baud the two inputs *e* and *g* of gate 27 are high and the output *j* thereof will close electronic switch 39 and thereby apply a negative cosine wave of frequency $f$ to the output line. During the fifth and sixth bauds the two inputs *c* and *h* of gate 29 will be high and the output 1 thereof will close electronic switch 37 to apply the negative cosine wave of frequency $f/2$ to the output *m*. During the last baud gate *j* again produces an output to apply a negative cosine wave of frequency $f$ to the output. It can be seen from waveform *m* that all of the signal elements blend smoothly together with no phase mismatch. It can be shown by a similar waveform analysis that if the two complementing flip-flops 23 and 24 are initially in the same state, that is, either both set or reset, there will be phase mismatch, of the type illustrated in FIG. 2*a*, when switching from one type of signal to another, that is, from 0 to 1 or vice versa. Similarly, if the flip-flops 23 and 24 are initially in opposite states, but 23 is initially reset and 24 initially set, there will be no phase mismatch, however, the phase of each baud will be the opposite from that shown in waveform *m*. If phase mismatch should occur due to the aforementioned condition, the circuitry provides automatic correction thereof. Phase mismatch can be corrected by reversing or changing the phase of the output of one of the ringing circuits 35 or 36. For example, the signal on line 14 must be changed from negative to positive phase and on line 15 from positive to negative phase while the phase of the signals on lines 16 and 17 remain unchanged. This phase change can be accomplished by shifting the phase or timing of the divided clock pulses which shock-excite the ringing circuits. If, for example, both ringing circuits are initially shock-excited by all the odd numbered clock pulses, a certain phase relationship will exist between the outputs of ringing circuits 35 and 36. If the timing of the divided clock pulses is then changed so that all even numbered clock pulses excite both resonant circuits, the phase of the ringing circuit 35 will be reversed but that of 36 will remain unchanged. Ringing circuit 36 is tuned to twice the frequency of the divided clock pulses and therefore the shift in the exciting pulses will not affect the phase thereof. Referring again to FIG. 4, the amplifier 41 is connected to the output line *m* and feeds an amplified sample of the output signal to differentiator 42, the output of which is amplified and clipped by 43 and fed to OR gate 7 as one input thereof, the other input of which is the clock pulse train. If a phase mismatch occurs such as shown in FIG. 2*a*, the sharp discontinuity in the waveform will be differentiated by 42 producing a single pulse, FIG. 2*b*, which is applied to frequency dividing flip-flop 30 through OR gate 7. This in effect adds an extra clock pulse to the input thereof, thereby shifting the timing of the output of 30 and causing the desired phase change in ringing circuits 35 and 36, as explained above. Thereafter, the remainder of the circuitry will maintain the required phase relationships, as explained above.

It should be noted that the complementing flip-flop which is actuated by the 0's in the input binary signal controls the phase or polarity of the 1's in the output signal and the complementing flip-flop actuated by the 1's in the input binary signal controls the phase or polarity of the 0's in the output. The reason for this is that the phase or polarity of any given baud depends on whether there were an odd or even number of the opposite type signals preceding it. For example, if there are an odd number of consecutive 0's in the binary information the first 1 which follows thereafter must be of opposite phase from the last 1 which preceded the 0's. For an even number of 0's the phase of a subsequent 1 must be the same as the last preceding 1. A similar rule obtains for an odd or even number of 1's followed by a 0. The fact that the waves of frequency $f$ go through one complete cycle during each baud and therefore the beginning and end thereof will be at the same instantaneous voltage and those of frequency $f/2$ go through only one half cycle during each baud and therefore the beginning and end thereof will be at opposite instantaneous voltages may lead to the erroneous conclusion that the rules should differ for 0's and 1's, however, an inspection of the waveforms of FIGS. 1 and 3 will show that the above-stated rules are correct. The state of the flip-flop 23, which is actuated by the 0's in the input determines whether the number of 0's is odd or even and controls the phase of the following 1 or mark signal in accordance therewith by virtue of its connection to the two gates 26 and 27.

While a specific embodiment of the invention has been described it should be understood that many alternate embodiments thereof will be obvious to those skilled in the art. Accordingly, the invention should be limited only by the scope of the appended claims.

What is claimed is:

1. A frequency shift keying generator comprising, a source of binary coded information, means to produce a pulse for each 1 in said stream in synchronism with the output of a clock, means to feed said pulses to the input of a first complementing flip-flop, means to produce a pulse for each 0 in said stream in synchronism with the output of said clock, means to feed said last-named pulses to the input of a second complementing flip-flop, means to produce an inverted and an uninverted replica of said stream of binary coded information, both synchronized with said clock, a first pair of AND gates, one input of each being the uninverted signal and the other input of each being one of the outputs of said second complementing flip-flop, a second pair of AND gates, one input of each being the inverted signal and the other input of each being one of the outputs of said first complementing flip-flop, means to generate positive and negative cosinusoidal waves of frequency $f$ and $f/2$ in synchronism with said clock, the outputs of said first pair of AND gates being arranged to control the application of said waves of frequency $f$ to an output line and said second pair of AND gates being arranged to control the application of said waves of frequency $f/2$ to said output line, and means to detect phase mismatch on said output line and automatically reverse the phase of said waves of frequency $f/2$ in response thereto.

2. A generator of frequency shift keyed cosine signals comprising, an input stream of binary information, means to reverse the state of a first complementing flip-flop in response to each 1 in said input stream of information, means to reverse the state of a second complementing flip-flop for each 0 in said input stream of information, means to feed a pulse to the set input of a third flip-flop for each 1 in the input stream of binary information, means to feed a pulse to the reset input of said third flip-flop for each 0 in the input stream of binary information, means to feed the set output of said third flip-flop to one of the inputs of each of a first pair of AND gates and the reset output thereof to one of the inputs of each of a second pair of AND gates, the two outputs of said second complementing flip-flop comprising the other inputs of said first pair of AND gates, the two outputs of said first complementing flip-flop comprising the other inputs of said second pair of AND gates, the outputs of said first pair of AND gates being applied as control signals to a first pair of normally open electronic switches, the inputs to said first pair of switches being positive and negative cosine waves of frequency $f$, the outputs of said second pair of AND gates being applied as control signals to a second pair of normally open electronic switches, the inputs of said second pair of switches being positive and negative cosine waves of frequency $f/2$, the outputs of all of said electronic switches being tied together to form an output line, means connected to said output line to detect phase mismatch in the output signal and to interchange the polarity or phase of the inputs to one of said pairs of electronic switches in response thereto.

3. A generator of frequency shift keyed binary telegraph signals of the cosine type, comprising, means to gate onto an output line a full cycle of a cosinusoidal wave of frequency $f$ in response to an input binary signal of one type and means to gate onto said output line a half cycle of a cosinusoidal signal of frequency $f/2$ in response to an input binary signal of an opposite type and means to control the phase or polarity of the cosinusoidal signal in any given baud in accordance with the number of opposite type signals which preceded it, said last-named means comprising means to determine whether the number of consecutive signals of said opposite type is odd or even, thereby providing a smoothly varying output signal with no phase mismatch therein.

References Cited by the Examiner

UNITED STATES PATENTS

| | | | |
|---|---|---|---|
| 3,023,269 | 2/62 | Maniere et al. | 178—67 X |
| 3,102,238 | 8/63 | Bosen | 328—27 |

DAVID G. REDINBAUGH, *Primary Examiner.*